United States Patent [19]

Shiba et al.

[11] Patent Number: 4,935,833
[45] Date of Patent: Jun. 19, 1990

[54] GUIDE MEMBERS FOR MAGNETIC TAPE CASSETTE

[75] Inventors: Haruo Shiba, Komoro; Kimio Tanaka; Takateru Sato, both of Saku, all of Japan

[73] Assignee: TDK Corporation, Tokyo, Japan

[21] Appl. No.: 264,226

[22] Filed: Oct. 28, 1988

[51] Int. Cl.5 ............... G11B 15/60; G11B 23/04; G03B 1/04; B65H 23/04
[52] U.S. Cl. .................... 360/132; 226/196; 242/199; 360/130.21
[58] Field of Search ............. 360/132, 130.21; 242/199; 226/196

[56] References Cited

U.S. PATENT DOCUMENTS

| | | | |
|---|---|---|---|
| 4,689,702 | 8/1987 | Oishi et al. | 360/132 |
| 4,700,254 | 10/1987 | Oishi et al. | 360/132 |
| 4,745,508 | 5/1988 | Tollefson | 360/132 |
| 4,746,575 | 5/1988 | Scarati et al. | 360/132 |
| 4,748,529 | 5/1988 | Shiba et al. | 360/132 |
| 4,821,135 | 4/1989 | Nakanishi et al. | 360/132 |

*Primary Examiner*—Robert S. Tupper
*Attorney, Agent, or Firm*—Seidel, Gonda, Lavorgna & Monaco

[57] ABSTRACT

Guide members along and with which a magnetic tape runs in sliding contact within a magnetic tape cassette housing are made of a liquid crystal polymer of a totally aromatic polyester filled with a lubricant. The lubricant is carbon fiber, graphite, or molybdenum disulfide.

4 Claims, 3 Drawing Sheets

GUIDE MEMBERS FOR MAGNETIC TAPE CASSETTE

BACKGROUND OF THE INVENTION

This invention relates to guide members located in the path of a magnetic tape within a magnetic tape cassette.

The term "guide members" as used herein is intended to embrace various types of guide pins, guide ribs, and other members with which the tape runs in sliding contact. Thus, the present invention is extensively applicable to the tape cassettes including video and audio tape cassettes of the type having a magnetic tape which is driven from reel to reel as it is fed and taken up and also having guide members with which the tape runs in sliding contact.

Video cassettes have tape guide members, commonly in the form of hollow posts, usually located at key points within the cassette housing to impart appropriate friction characteristics to the tape during its running. In general, guide members of this character are made primarily of metallic materials. Since the handling of magnetic tape can lead to the buildup of a static charge, the tape guide members are often fabricated from nonmagnetic stainless steels. Where such metals are used, the tape-contacting surface of the parts must be smoothened by plating, polishing, lapping, or other finish to properly reduce the friction with the running tape and avoid damaging of the tape due to the sliding contact. Altogether, these make the guide members expensive. To save the cost, proposals have so far been made to replace the metallic materials by the general purpose resin GP and other resins commonly known as engineering plastics, such as ABS, POM, and PC, filled with various lubricants. However, these substitutes generally show such high rates of molding shrinkage on solidification at the time of injection molding or extrusion that the moldings or extrusions are distorted under strains. Consequently, the resulting guide members are curled or wavy on the surface and, as compared to the members of metallic materials, they are too inferior in smoothness for practical use.

SUMMARY OF THE INVENTION

The present invention therefore has for its object to provide guide members of excellent smoothness, dimensional accuracy, strength, and friction characteristics for use in magnetic tape cassettes.

According to the invention, guide members with which a tape runs in sliding contact within a tape cassette housing are characterized in that they are made of a liquid crystal polymer of a totally aromatic polyester filled with a lubricant.

Desirably, the lubricant is chosen from among carbon fiber, graphite, and molybdenum disulfide.

The guide members in accordance with the invention possess very high surface smoothness and dimensional stability because the plastic material undergoes exceptionally low shrinkage on molding. The invention eliminates the need of cumbersome processing or finish as with metallic materials, and an ordinary plastic molding process may be employed to an economic advantage. Moreover, the guide members of the invention have higher strength than the existing ones of plastics and cause less damage to the tape, improving its durability. Their low friction coefficients compared to conventional metallic and plastic guide members enable the guide members of the invention to improve the running stability of the tape.

DESCRIPTION OF THE PREFERRED EMBODIMENTS

The guide member of the invention can be incorporated in a part or whole of the means located in the path of the tape in a magnetic tape cassette to guide the tape in sliding contact therewith. In the following description only a guide member forming a part of the means will be described in detail. It should be obvious to one having ordinary skill in the art that the invention is easily applicable to the other guide means with minor modifications necessary.

Figure 1:
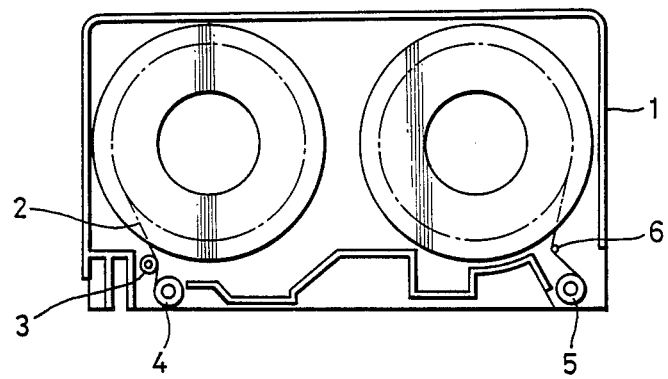
FIG. 1 is a plan view of a video tape cassette incorporating the present invention.

In FIG. 1 a lower section of a cassette housing is shown, with a magnetic tape 2 extended from one of two rotatable hubs or reels within the housing in a path extended at the front of the housing, along guide members 3, 4, 5, and 6 to the other rotatable reel. Of these guide members, fixed ones designated at 4 and 5 usually consist of stainless steel members supported by pins 7 and 8, respectively. According to this invention, they are made of a liquid crystal polymer instead. While the guide members 4 and 5 are described hereinafter as fabricated in accordance with the invention, it should be clear to one skilled in the art that the guide members 3 and 6 too may be made in conformity with the invention.

Figure 3A:
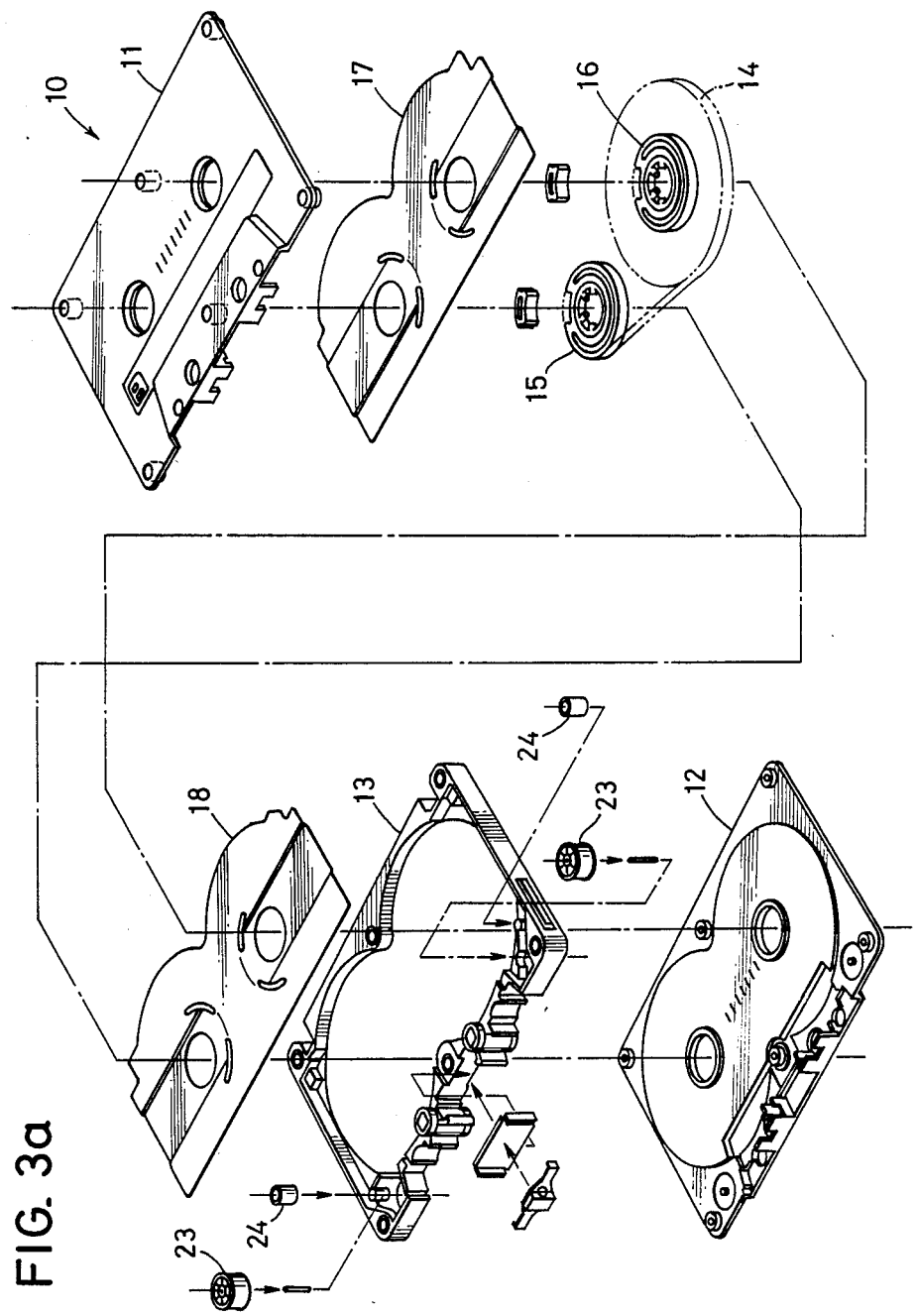
FIGS. 3A and B shows an audio tape cassette incorporating the invention, in perspective and as exploded.
Figure 3B:
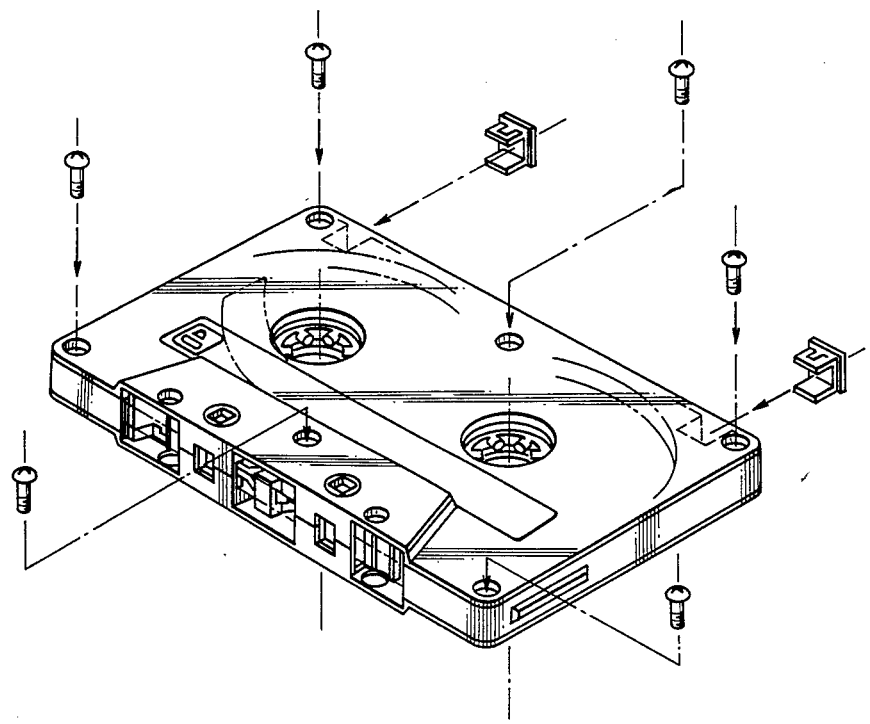

Referring to FIG. 3, which comprises an exploded view (a) and a perspective view (b) illustrative of assembling, there is shown a cassette 10 basically consisting of two transparent plates 11 and 12 fastened to each other, with a frame 13 held in between. The cassette housing thus assembled contains a pair of rotatable reels 15 and 16 on which a length of magnetic tape 14 is wound, a pair of transparent lubricant sheets 17 and 18, and other necessary members.

The magnetic tape 14 runs past a guide pin 19, guide roller 20, fixed guide member 21, guide roller 23, and guide pin 24, in the order mentioned. The guide member of the invention may constitute one or each of these members, but for the sake of explanation it is herein assumed that the fixed guide member 21 is made of a liquid crystal polymer in accordance with the invention.

Figure 2:
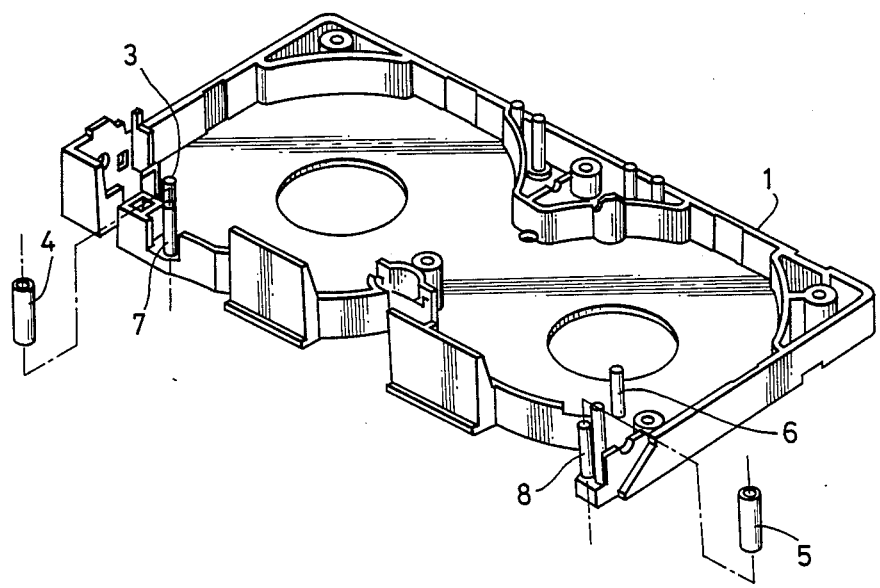
FIG. 2 is a perspective view of the cassette, with the magnetic tape taken out.
Figure 4:
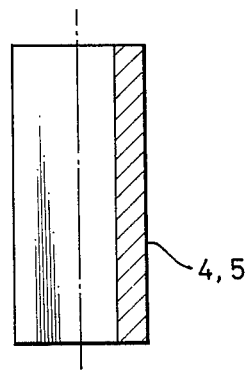
FIG. 4 is an enlarged fractional view, in vertical section, of a guide member embodying the invention.

In FIG. 4 the guide member 4 or 5 shown in FIGS. 1 and 2 is illustrated in a fragmentary section on an enlarged scale. This member, cylindrical in shape, is fabricated by extrusion, injection molding, or other similar plastic molding technique.

The guide member is made of a mixture of a liquid crystal polymer of a totally aromatic polyester resin, and a lubricant. The liquid crystal polymer, marketed by the Celanese Corp. of the U.S. under the trade designation "Vectra," is a stiff, macromolecular resin whose molecular chains are only slightly bent in the molten state. By way of experiment, guide members were made solely of the resin.

Table 1 compares the molding shrinkage of the guide members made of the particular liquid crystal polymer with those of members made of conventional materials. As can be seen from the table, the molding shrinkage of the guide members of the liquid crystal polymer was as low as about 0.05%. The surface smoothness and dimensional stability after molding were very high compared to those of the other resins. Unfortunately, however, the liquid crystal polymer guide members exhibited a rather high coefficient of friction with magnetic tapes, almost as high as those of the guide members made of existing resins, and proved inferior in this respect to metallic guide members.

TABLE 1

| Material | Molding shrinkage (%) |
| --- | --- |
| Liquid crystal polymer | 0.05–0.10 |
| ABS.PS | 0.40–0.60 |
| POM | 2.00–2.30 |
| PC | 0.50–0.80 |

In an effort to eliminate this disadvantage, carbon fiber, graphite, or molybdenum disulfide was filled as lubricant in the liquid crystal polymer. It has now been found that in all cases marked improvements are achieved in friction characteristics.

Experimentally, the liquid crystal polymer "Vectra" was mixed with about 30% by weight of carbon fiber. After thorough mixing above the melting point of the liquid crystal polymer, 280° C., the mixture was injection molded into a guide member. In another run, the carbon fiber was replaced by about 25% by weight of graphite, but otherwise in the same way a guide member was made. Further, a guide member was made similarly with the exception that about 20% by weight of molybdenum disulfide was used instead. For control, guide members of stainless steel (lapped) and POM (filled with carbon fiber) were made. Table 2 gives the dynamic friction coefficients determined of those test guide members.

TABLE 2

| Material and lubricant added | Dynamic fric. coeff. |
| --- | --- |
| Stainless steel (lapped) | 0.32 |
| POM (with filler) | 0.40 |
| Liquid crystal polymer alone | 0.35 |
| Liquid crystal polymer plus | |
| graphite | 0.25 |
| carbon fiber | 0.23 |
| molybdenum disulfide | 0.25 |

It will be seen from this table that the guide members of the invention exhibited far better friction characteristics than the lubricant-filled resin guide member of the prior art and was even superior to stainless steel.

For these tests cylindrical guide members for video tape cassettes were used. The same material and lubricants also may be employed for the fabrication of guide members 21 for an audio tape cassette as shown in FIG. 3. In the latter embodiment, for example, the main body of the intermediate frame 13 may be formed of metal and the guide members 21 alone made of the liquid crystal polymer described in the preceding example.

The mixing ratio of the liquid crystal polymer to the lubricant may be suitably changed as desired. Generally, a desirable proportion of the lubricant is from 10 to 50 or less percent by weight of carbon fiber, from 10 to 50% by weight of graphite, or from 5 to 40% by weight of molybdenum disulfide.

As described above, the present invention uses a composition consisting of a totally aromatic polyester and one of specific lubricants in manufacturing tape guide members. It thus provides tape guide members which possess excellent surface smoothness and dimensional stability plus good characteristics of friction with magnetic tapes and which, moreover, are less expensive and yet higher in quality than metallic guide members. The tape guide members of the invention, made to varied shapes and located in key positions within the cassette housing, ensure stable running of the magnetic tape and substantially extend the tape life while allowing it to maintain satisfactory recording and reproduction.

What is claimed is:

1. A guide member for a magnetic tape cassette along which a magnetic tape runs in sliding contact therewith, comprising a member made of a liquid crystal polymer of a total aromatic polyester filled with a lubricant.

2. A guide member according to claim 1 wherein the lubricant is carbon fiber.

3. A guide member according to claim 1 wherein the lubricant is graphite.

4. A guide member according to claim 1 wherein the lubricant is molybdenum disulfide.

* * * * *